US008877154B2

(12) United States Patent
Albers

(10) Patent No.: US 8,877,154 B2
(45) Date of Patent: Nov. 4, 2014

(54) GRAPHITE ARTICLE

(75) Inventor: Tracy Albers, Westlake, OH (US)

(73) Assignee: GrafTech International Holdings Inc., Parma, OH (US)

(*) Notice: Subject to any disclaimer, the term of this patent is extended or adjusted under 35 U.S.C. 154(b) by 0 days.

(21) Appl. No.: 14/127,220

(22) PCT Filed: Jul. 27, 2012

(86) PCT No.: PCT/US2012/048600
§ 371 (c)(1),
(2), (4) Date: Dec. 18, 2013

(87) PCT Pub. No.: WO2013/066443
PCT Pub. Date: May 10, 2013

(65) Prior Publication Data
US 2014/0147363 A1   May 29, 2014

Related U.S. Application Data

(60) Provisional application No. 61/512,672, filed on Jul. 28, 2011.

(51) Int. Cl.
*C01B 31/04* (2006.01)
*C04B 35/52* (2006.01)
*C04B 35/532* (2006.01)
*C04B 35/622* (2006.01)

(52) U.S. Cl.
CPC .............. *C01B 31/04* (2013.01); *C04B 35/522* (2013.01); *C04B 35/532* (2013.01); *C04B 35/62204* (2013.01); *C04B 2235/424* (2013.01); *C04B 2235/77* (2013.01); *C04B 2235/96* (2013.01); *C04B 2235/9607* (2013.01)
USPC .......................................... 423/448; 376/172

(58) Field of Classification Search
CPC ................................. C01B 31/04; G21G 1/06
USPC ............................................ 376/172; 423/448
See application file for complete search history.

(56) References Cited

U.S. PATENT DOCUMENTS 3,092,437 A   6/1963   Carter et al.
2008/0063590 A1   3/2008   Miller et al.

OTHER PUBLICATIONS

Smith, M. C. The Manufacture and Properties of an Extruded, Resin-Bonded Graphite, CMF-13 Lot AAQ1. No. LA-3981. Los Alamos Scientific Lab., N. Mex., 1968.*
Ojovan et al., "Self Sustaining Vitrification for Immobilisation of Radioactive and Toxic Waste", Glass Technol., 2003, 44(6), 218-224; retrieved from http://www.isl.group.sheffield.ac.uk/papers/MIOGlassTech2003vitpaper.pdf on Mar. 13, 2013.
USPTO, International Search Report and Written Opinion of the International Searching Authority for PCT/US12/048600, Mailed Apr. 5, 2013.
USPTO, International Preliminary Report on Patentability for PCT/US12/048600, Mailed Jan. 28, 2014.

* cited by examiner

*Primary Examiner* — Richard M Rump

(57) ABSTRACT

One use for irradiated graphite after remediation processing is to recycle it into a new graphite artifact. Examples of such artifacts include an electrode to be used for vitrification of radionucleotides, graphite or carbon articles for uranium processing, a moderator for a HTGR, in particularly a Gen IV HTGR, other types of graphite products for nuclear facilities, charcoal filters, silicon carbide applications, etc. Such graphite artifacts can be formed with up to 20 pph of carbon black, the carbon black is formed from vitrified irradiated graphite. Optionally the graphite artifact may be formed from up to 75 pph of pitch.

17 Claims, 3 Drawing Sheets

GRAPHITE ARTICLE

BACKGROUND

Disclosed herein is a graphite article which is formed from vitrified irradiated graphite which is in the form of carbon black.

As nuclear power becomes a more prevalent source of energy, the use of high temperature gas reactors (HTGR) will also increase. This is will increase the amount of irradiated graphite produced on a yearly basis. Options regarding the disposal or recycling of the irradiated graphite will shift to the forefront.

BRIEF SUMMARY

One option is to recycle the irradiated graphite after processing into a new graphite artifact. Examples of such artifacts include an electrode to be used for vitrification of radionucleotides, graphite or carbon articles for uranium processing, a moderator for a HTGR, in particularly a Gen IV HTGR, other types of graphite products for nuclear facilities, charcoal filters, silicon carbide applications, etc.

Such graphite artifacts can be formed with up to 20 pph of carbon black, the carbon black is formed from vitrified irradiated graphite. Optionally the graphite artifact may be formed from up to 75 pph of pitch. Throughout this document "pph" uses as an abbreviation of parts per hundred and the basis is 100 parts of coke filler.

DETAILED DESCRIPTION

Figure 1:
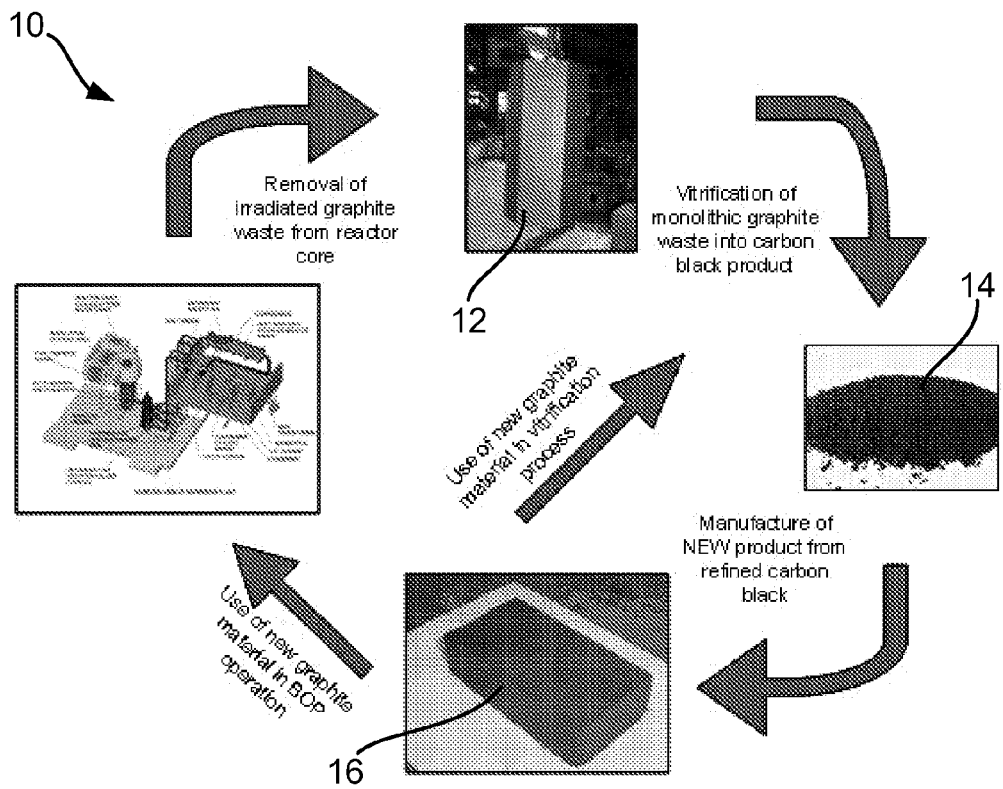
FIG. 1 is a drawing of a concept of how the irradiated graphite may be recycled.

Shown in FIG. 1, designated 10 is an overview of an embodiment for a process for the recycling irradiated graphite. Shown as 12 is a sample of irradiated monolithic graphite. The graphite is vitrified and transformed into carbon black 14. Carbon black 14 may be used to form new graphite artifact 16. One use of graphite artifact 16 is an application in a nuclear plant, especially such a plant with a HTGR, more particularly a GEN IV HTGR.

Graphite artifact 16 is formed from at least carbon black 14, pitch and petroleum coke. Typically mix designs for artifact 16 are based on 100 parts of coke. Other precursors for artifact 16 may be used if so desired. Such alternate precursors may include carbon fibers, cross linking agents, processing aids, etc. Various types of carbon fibers may be used depending on the desired end application. The chosen fibers may be used to improve insulating properties, strength properties, conductivity properties or combinations thereof of artifact 16.

In one embodiment, artifact 16 may be formed from up to 20 pph of carbon black 14. In a particular embodiment, up to about 10 pph of carbon black 14 may be used to form artifact 16. In a further embodiment up to about 5 pph of carbon black 14, may be used to form artifact 16. In further particular embodiments, artifact 16 may be formed from up to about 75 pph of pitch, preferably about 60 pph of pitch, more preferably up to about 50 pph of pitch.

Artifact 16 is not limited to be formed by any particular forming technique. Artifact 16 may be an extruded, molded, or isomolded graphite. Typically processing techniques for afore noted types of graphite may be used form artifact 16. In the case of using higher loading levels of carbon black 14 or carbon fibers in certain instances it may be advantageous to use aggressive mixing techniques to enhance the homogenous nature of the precursor mix.

Exemplary steps of making artifact 16 include milling of the precursors to desired sizes, mixing the precursors, and forming the artifact. Typically then artifact 16 is carbonized by heating the formed artifact to a temperature of 600-1400° C. The carbonized artifact may then be subjected to a desired number of impregnation and carbonizations steps for artifact 16 to reach a desired density. The appropriately densified artifact is then graphitized into artifact 16.

EXAMPLES

Two samples of seven (7) different varieties of graphite material with 0 to 10% carbon black were fabricated (% carbon black was based on the dry fraction of the mix design) in order to evaluate the change in properties that occurred as the fraction of carbon black within the graphite increased.

After manufacture, the material was characterized for coefficient of thermal expansion, sonic modulus, specific resistance, density and flexural strength. Also, optical microscopy was used to evaluate the structure of the formed artifacts.

Small scale graphite electrodes have been fabricated using a mixture of petroleum coke, binder (coal tar) pitch and varying fractions of carbon black additive. These ingredients have been mixed together at room temperature using pitch in the solid form. The pre-made mixtures vary in carbon black content according to table 1 below:

TABLE 1

| Mixture | % Carbon Black (Thermax) |
|---|---|
| A - control | 0 |
| B | 1 |
| C | 2 |
| D | 3 |
| E | 4 |
| F | 5 |
| G | 10 |

The amount of pitch in each mixture has been optimized for the manufacturing conditions and the varying fraction of carbon black. For example, artifacts made with higher amounts of carbon black used additional fractions of binder pitch.

Mixture "G" was not able to be processed, as large aggregates of carbon black resulted in selected areas of the final artifact and it became very brittle.

Figure 2:
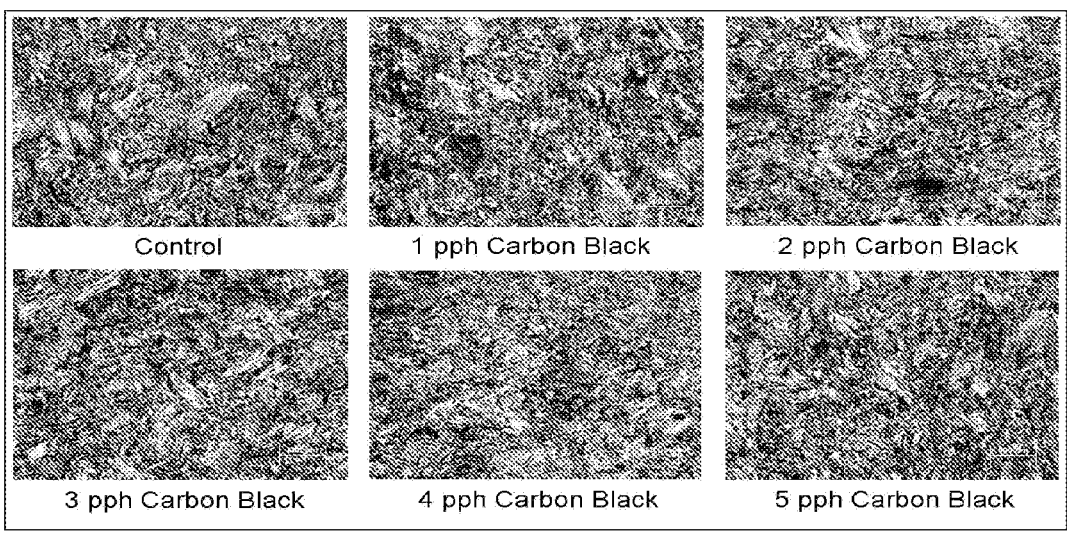
FIG. 2 is a microscopy view of the graphite made in accordance with the examples.

Optical microscopy images taken of representative areas of the final graphitic artifacts produced for this work are shown in FIG. 2. Uniform structure is evident in the artifact, aside from aggregates of carbon black that can appear with increased loading of the non-graphitizable particles. It is postulated that increased mixing time may help to correct the formation of the carbon black aggregates and in turn increase the overall processability, uniformity and quality of the final material.

Figure 3:
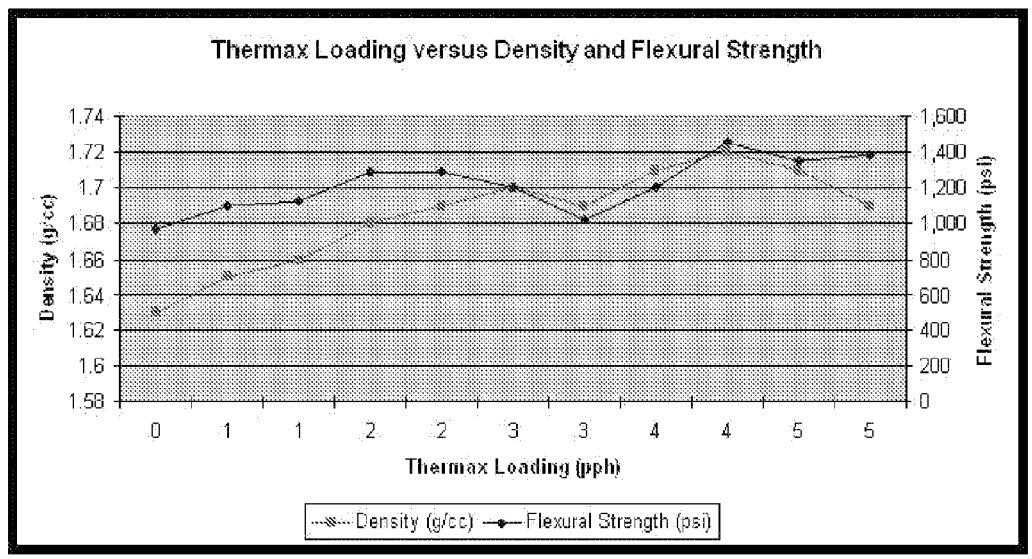
FIGS. 3-6 are charts of the testing results of graphite samples made in accordance with the examples.
Figure 4:
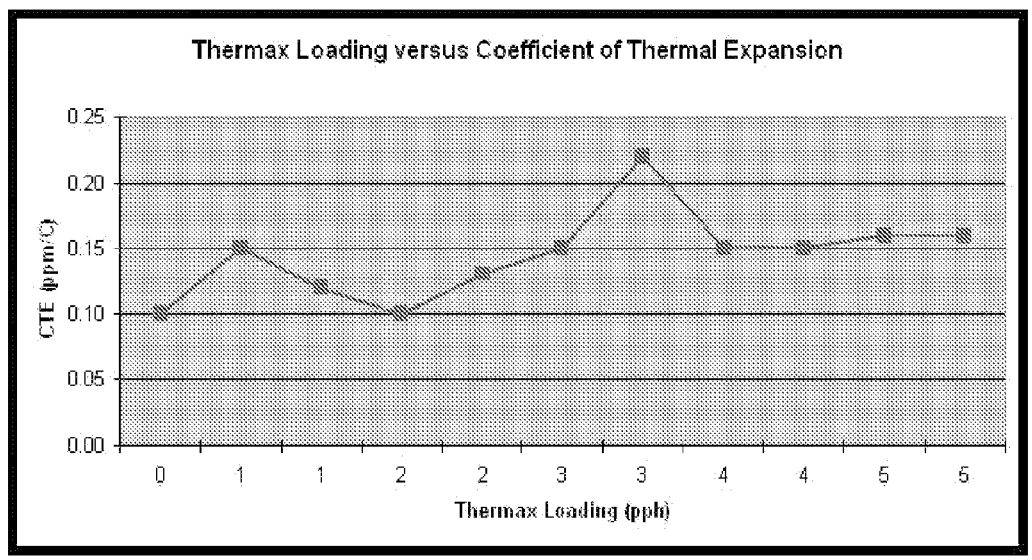
Figure 5:
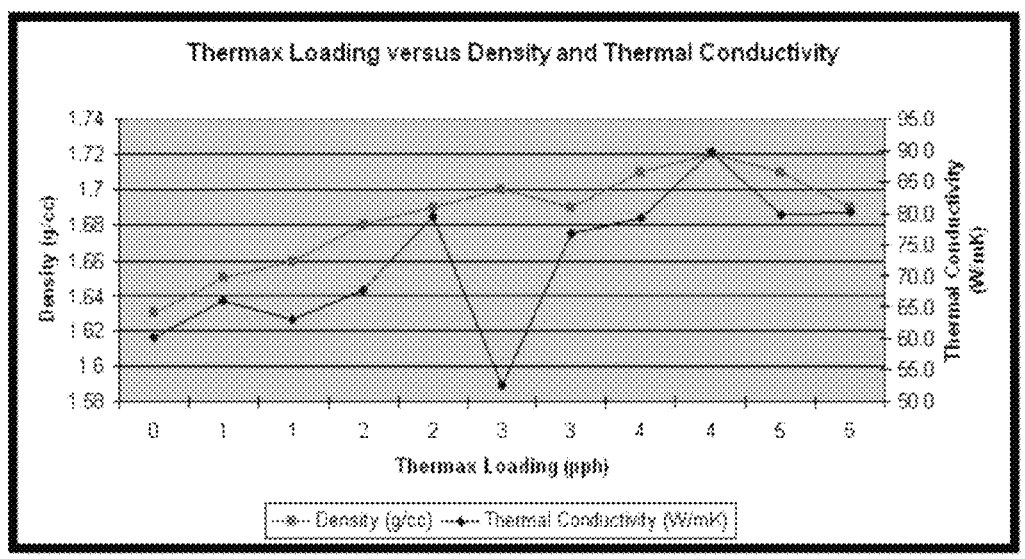
Figure 6:
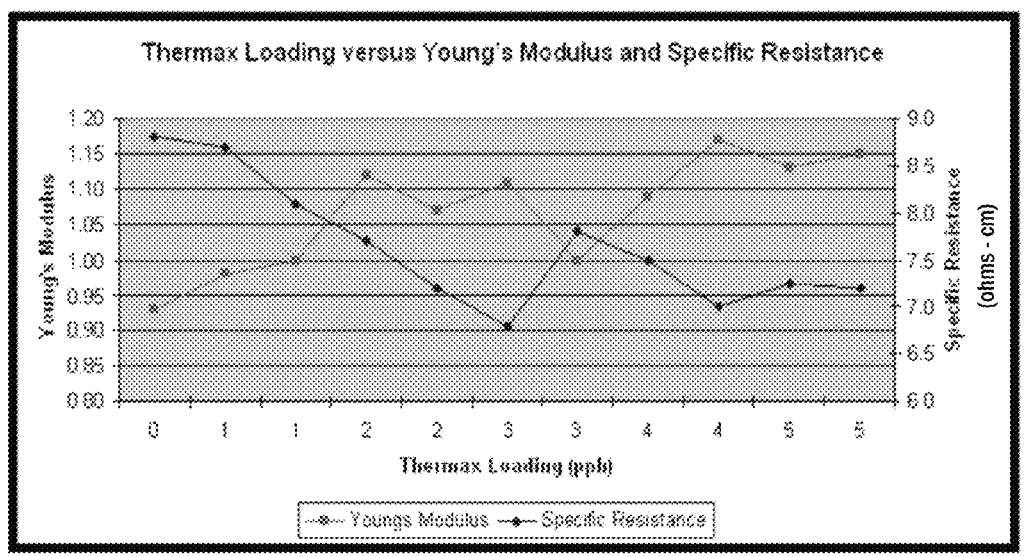

Other analysis performed on the graphite artifacts included density, flexural strength (FIG. 3), coefficient of thermal expansion (FIG. 4), thermal conductivity (FIG. 5), Young's modulus and specific resistance (FIG. 6). All figures show two samples tested for each value of carbon black loading.

While some variations are measured for the properties of the graphite artifacts, no significant deviations out of the range of acceptable properties were observed.

Carbon black can be utilized as a filler material in new graphite artifacts. These materials can be manufactured using various processing techniques.

The work completed hereunder has demonstrated that carbon black loading was easily accomplished up to 5 pph of the dry fraction of the material.

The final properties of the graphite presented herein are within the range of 'acceptable' graphite material for the purpose of vitrification of nuclear waste. Further development work could also be done to significantly strengthen this material and further enhance the other basic properties of the graphite.

What is claimed is:

1. A graphite artifact comprising 1 to 19 pph of carbon black, the carbon black comprising vitrified irradiated graphite, the artifact having a specific resistance of 8.6 to 6.5 Ω-cm.

2. The graphite artifact of claim 1 having up to 10 pph of the carbon black.

3. The graphite artifact of claim 2 having up to 5 pph of carbon black.

4. The graphite artifact of claim 1 wherein the graphite artifact comprises extruded graphite.

5. The graphite artifact of claim 1 wherein the graphite artifact comprises molded graphite.

6. The graphite artifact of claim 1 wherein the graphite artifact comprises up to 75 pph of pitch.

7. The graphite artifact of claim 6 wherein the graphite artifact comprises up to 50 pph of pitch.

8. The graphite artifact of claim 1 having a CTE of 0.15 to 0.22 ppm/° C.

9. A graphite artifact comprising 1 to 10 pph of carbon black, the carbon black comprising vitrified irradiated graphite, the artifact having a thermal conductivity of 52-90 w/mK.

10. The graphite artifact of claim 9 comprising 1 to 5 pph of carbon black.

11. The graphite artifact of claim 9 wherein the graphite artifact comprises extruded graphite.

12. The graphite artifact of claim 9 wherein the graphite artifact comprises molded graphite.

13. The graphite artifact of claim 9 wherein the graphite artifact comprises up to 75 pph of pitch.

14. The graphite artifact of claim 9 wherein the graphite artifact comprises up to 50 pph of pitch.

15. The graphite artifact of claim 9 having a CTE of 0.15 to 0.22 ppm/° C.

16. A graphite artifact comprising 1 to 9 pph of carbon black, the carbon black comprising vitrified irradiated graphite, the artifact having a specific resistance of 8.6 to 6.5 Ω-cm.

17. The graphite artifact of claim 16 having a thermal conductivity of 52-90 w/mK.

* * * * *